US010569817B2

(12) United States Patent
Lin et al.

(10) Patent No.: US 10,569,817 B2
(45) Date of Patent: Feb. 25, 2020

(54) MAGNETIC CARRYING PLATFORM

(71) Applicant: DALIAN UNIVERSITY OF TECHNOLOGY, Dalian (CN)

(72) Inventors: Yan Lin, Dalian (CN); Xiaoning Jiang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 53 days.

(21) Appl. No.: 16/049,843

(22) Filed: Jul. 31, 2018

(65) Prior Publication Data

US 2018/0334207 A1 Nov. 22, 2018

Related U.S. Application Data

(63) Continuation-in-part of application No. PCT/CN2017/087656, filed on Jun. 9, 2017.

(30) Foreign Application Priority Data

Oct. 25, 2016 (CN) .......................... 2016 1 0931626

(51) Int. Cl.
*B62D 57/024* (2006.01)
*B60B 19/00* (2006.01)
*B62B 3/02* (2006.01)
*B62B 3/06* (2006.01)
*B62B 5/06* (2006.01)

(52) U.S. Cl.
CPC .......... *B62D 57/024* (2013.01); *B60B 19/006* (2013.01); *B60B 2900/931* (2013.01); *B60Y 2200/60* (2013.01); *B62B 3/02* (2013.01); *B62B 3/06* (2013.01); *B62B 3/0606* (2013.01); *B62B 3/0612* (2013.01); *B62B 5/062* (2013.01)

(58) Field of Classification Search
CPC .. B62B 5/062; B62B 3/02; B62B 3/06; B62B 3/0606; B62B 3/0612; B62D 57/024; B60B 19/006; B60B 2900/931; B60Y 2200/60
See application file for complete search history.

(56) References Cited

U.S. PATENT DOCUMENTS

| 2018/0281552 | A1* | 10/2018 | Lee ........................... B25J 5/00 |
| 2019/0017656 | A1* | 1/2019 | Carrasco Zanini ... B60B 19/006 |
| 2019/0241223 | A1* | 8/2019 | Parrott ................. B62D 57/024 |
| 2019/0242743 | A1* | 8/2019 | Patel ..................... B62D 57/024 |
| 2019/0329400 | A1* | 10/2019 | Carrasco Zanini ...... B25J 5/007 |

* cited by examiner

*Primary Examiner* — Joseph M Rocca
*Assistant Examiner* — Marlon A Arce
(74) *Attorney, Agent, or Firm* — Matthias Scholl P.C.; Matthias Scholl

(57) ABSTRACT

A magnetic frame mechanism including an outer frame, first drop center wheels, first brackets, a permanent magnet block. The outer frame includes a face plate, a first side plate, and a second side plate. The first side plate and the second side plate are vertically fixed on two ends of the face plate, respectively. The permanent magnet block is sandwiched between the first side plate and the second side plate. The first side plate and the second side plate include guide structures, and the guide structures include first guide rails. The first drop center wheels are fixed on the inner side of the face plate via the first brackets, respectively. The platform mechanism includes a platform plate, four magnetic travelling wheels, four second brackets, a second guide rail disposed on the surface of the platform plate, and a tension spring.

1 Claim, 16 Drawing Sheets

MAGNETIC CARRYING PLATFORM

CROSS-REFERENCE TO RELAYED APPLICATIONS

This application is a continuation-in-part of International Patent Application No. PCT/CN2017/087656 with an international filing date of Jun. 9, 2017, designating the United States, now pending, and further claims foreign priority benefits to Chinese Patent Application No. 201610931626.3 filed Oct. 25, 2016. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND

This disclosure relates to a magnetic carrying platform capable of moving freely on the surface of decks and bulkheads of the ships.

The decks and bulkheads of the ships require welding, cleaning, and coating repeatedly in the manufacturing process. The machinery for implementing such operations are carried by platform devices. However, conventional carrying platforms are fixed on the decks or bulkheads and cannot move freely in the working process. This reduces the work efficiency.

SUMMARY

Disclosed is a magnetic carrying platform that can move freely on the surface of decks and bulkheads of the ships.

The magnetic carrying platform comprises a magnetic frame mechanism; a platform mechanism; and a slider mechanism.

The magnetic frame mechanism comprises an outer frame, first drop center wheels, first brackets, a permanent magnet block; the outer frame comprises a face plate, a first side plate, and a second side plate; the first side plate and the second side plate are vertically fixed on two ends of the face plate, respectively; the permanent magnet block is sandwiched between the first side plate and the second side plate; the first side plate and the second side plate comprise guide structures, and the guide structures comprise first guide rails; the first drop center wheels are fixed on the inner side of the face plate via the first brackets, respectively.

The platform mechanism comprises a platform plate, four magnetic travelling wheels, four second brackets, a second guide rail disposed on a surface of the platform plate, and a tension spring; two ends of the platform plate comprise guide grooves, and the guide grooves correspond to the first guide rails so that the platform plate is capable of moving along the first guide rails of the first side plate and the second side plate; the first guide rails each comprises a spring stop above the platform plate and a limit plate disposed below the platform plate; the tension spring is disposed between the spring stop and the platform plate; the platform plate is supported by the four magnetic travelling wheels via the four second brackets.

The slider mechanism comprises a trough type slider, a pull bar, second drop center wheels, and third brackets. The trough type slider comprises a bottom slideway, a side slideway, a convex sliding plate disposed in the side slideway, a pressure spring, upper horizontal rails, slanted rails, and lower horizontal rails; each slanted rail connects one upper horizontal rail and one lower horizontal rail to form a rail group; the pressure spring is fixed on one end of the convex sliding plate, and the convex sliding plate butts against the second side plate via the pressure spring; the first side plate comprises a through hole allowing the pull bar to pass through; the convex sliding plate is disposed on one end of the trough type slider, and the other end of the trough type slider is connected to the pull bar passing through the through hole of the second side plate; a plurality of rail groups is continuously disposed on the trough type slider, and each rail group corresponds to one first drop center wheel; the second drop center wheels are connected to the trough type slider via the third brackets; the second drop center wheels correspond to the second guide rail disposed on the surface of the platform plate; and the platform plate comprises a round hole, the permanent magnet block comprises a cylindrical touch rod, the bottom slideway comprises a recess, and the cylindrical touch rod passes through the round hole of the platform plate and extends into the recess of the bottom slideway of the trough type slider.

Advantages of the magnetic carrying platform in the disclosure are summarized as below. The magnetic carrying platform can move steadily and freely on the surface of decks and bulkheads of the ships, which can improve the security and work efficiency.

Figure 1:
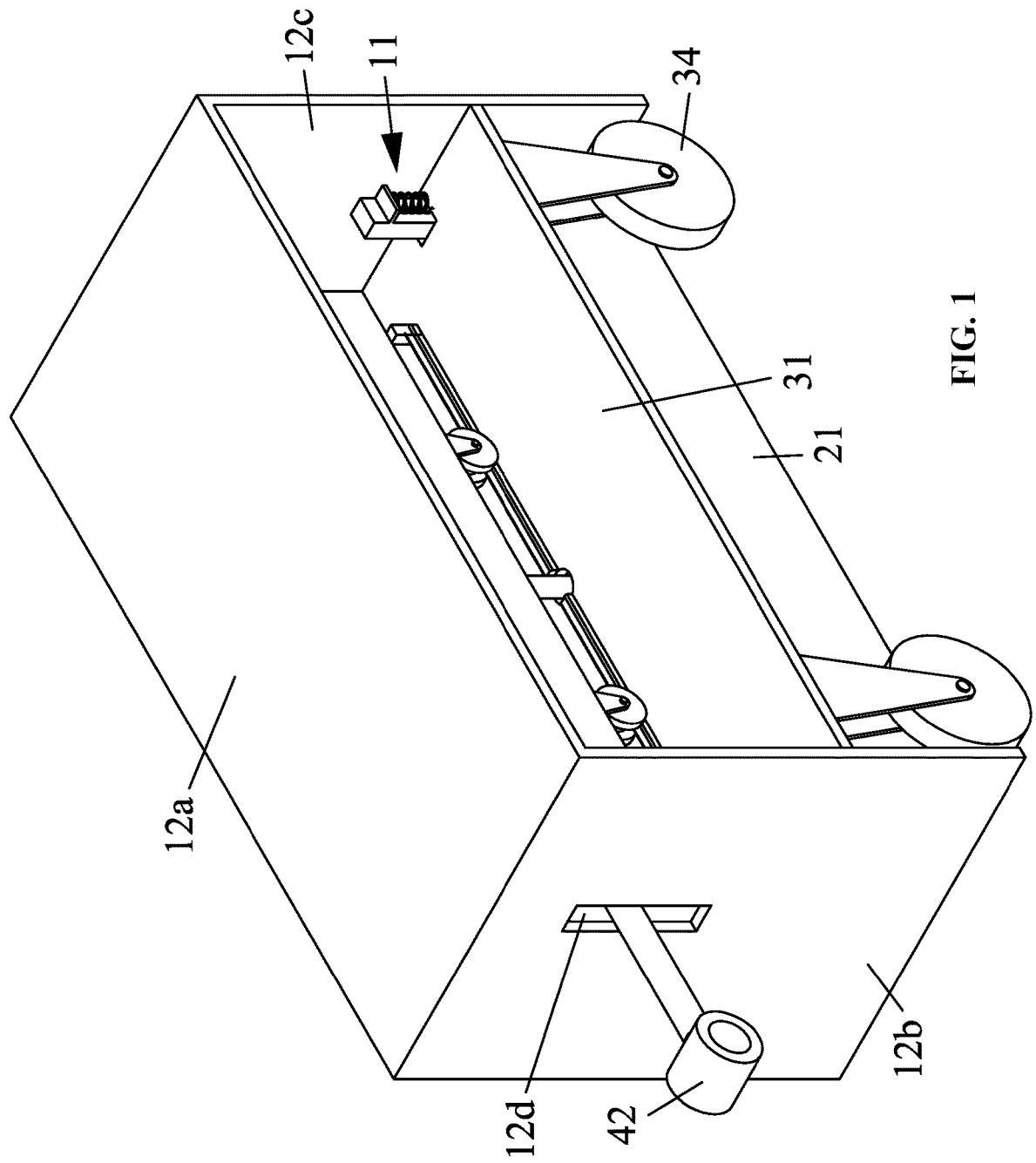
FIG. 1 is a stereogram of a magnetic carrying platform of the disclosure.
Figure 2:
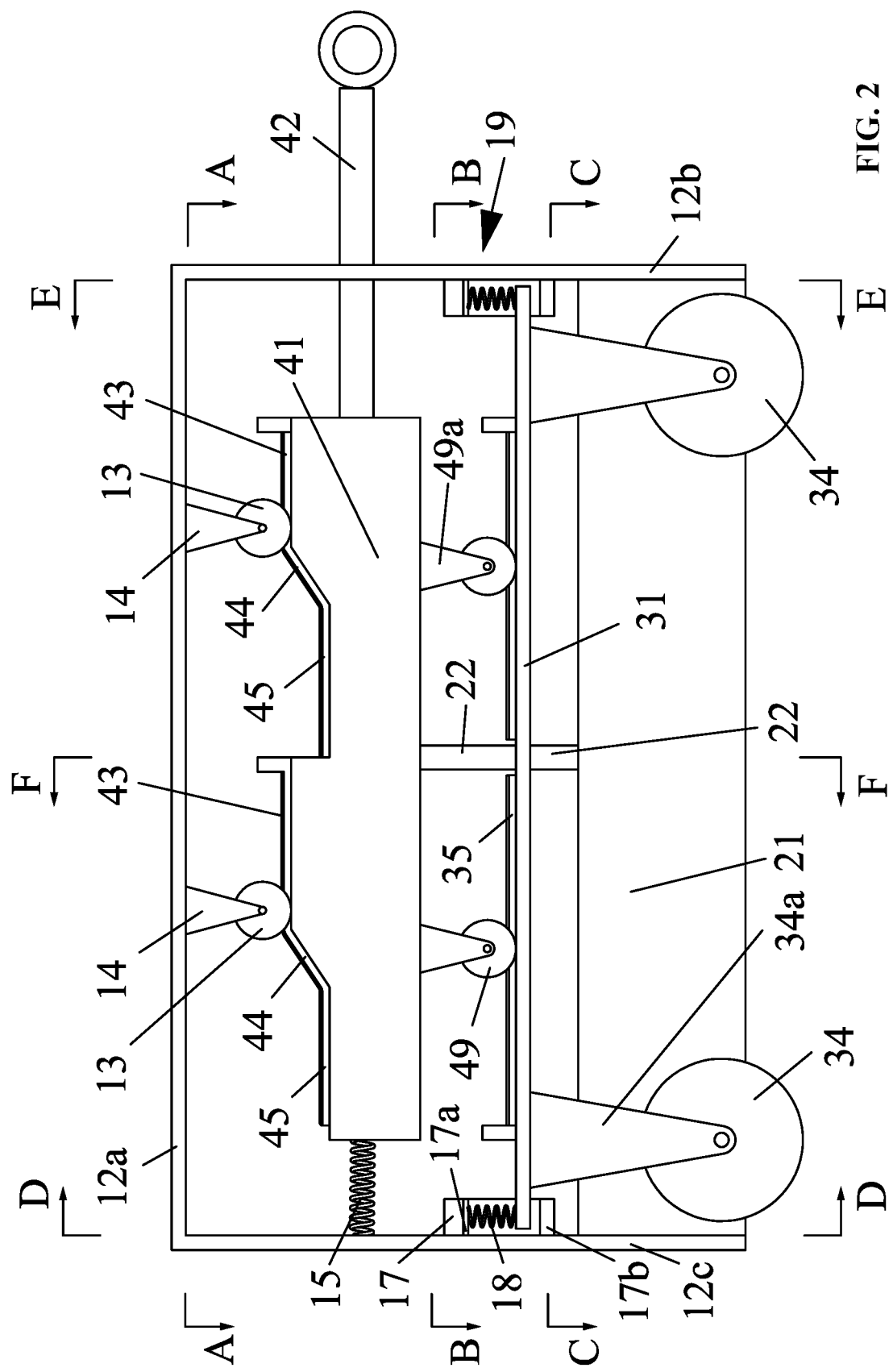
FIG. 2 is a front view of a magnetic carrying platform in FIG. 1.
Figure 3:
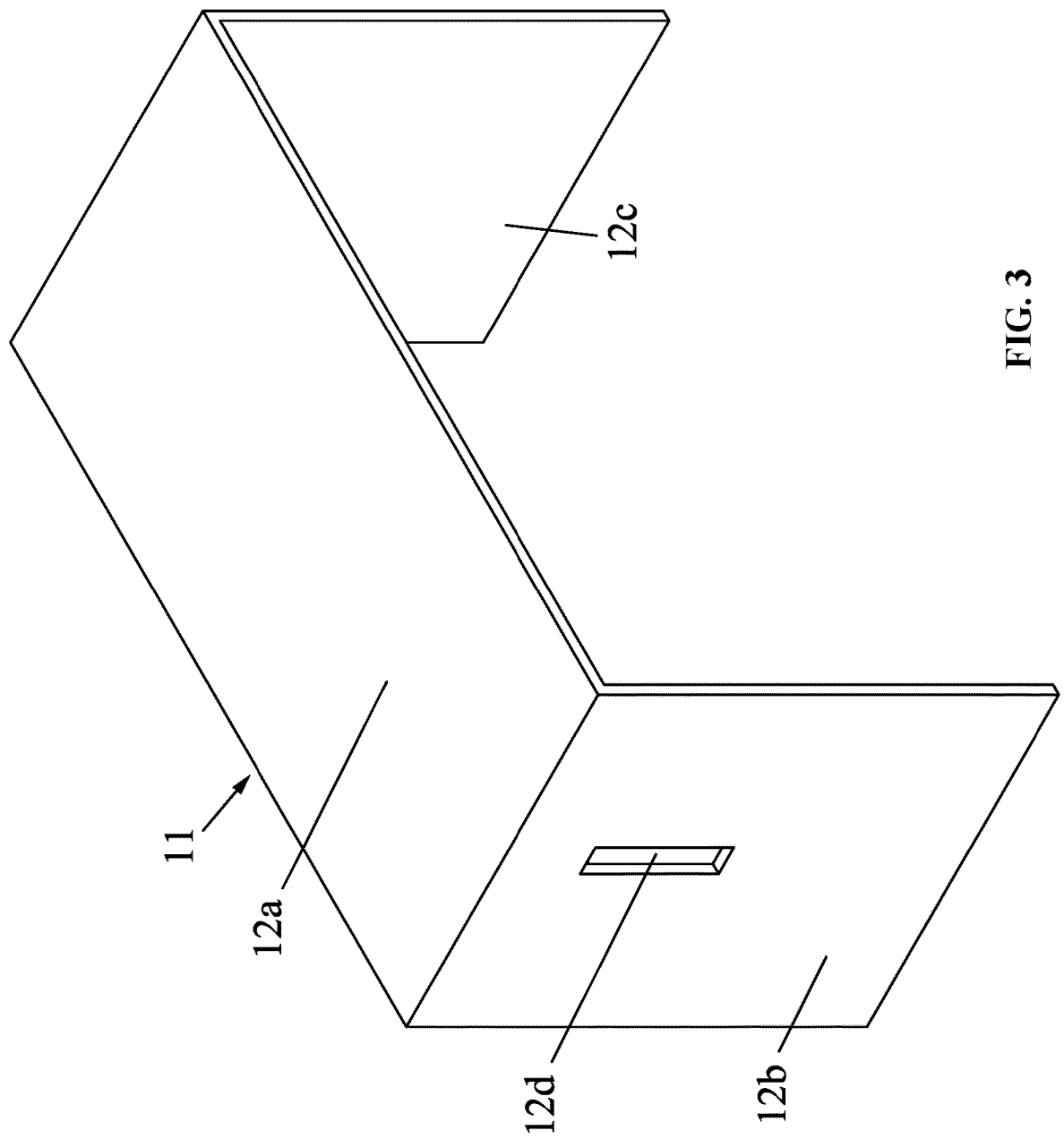
FIG. 3 is a stereogram of an outer frame of the disclosure.
Figure 4:
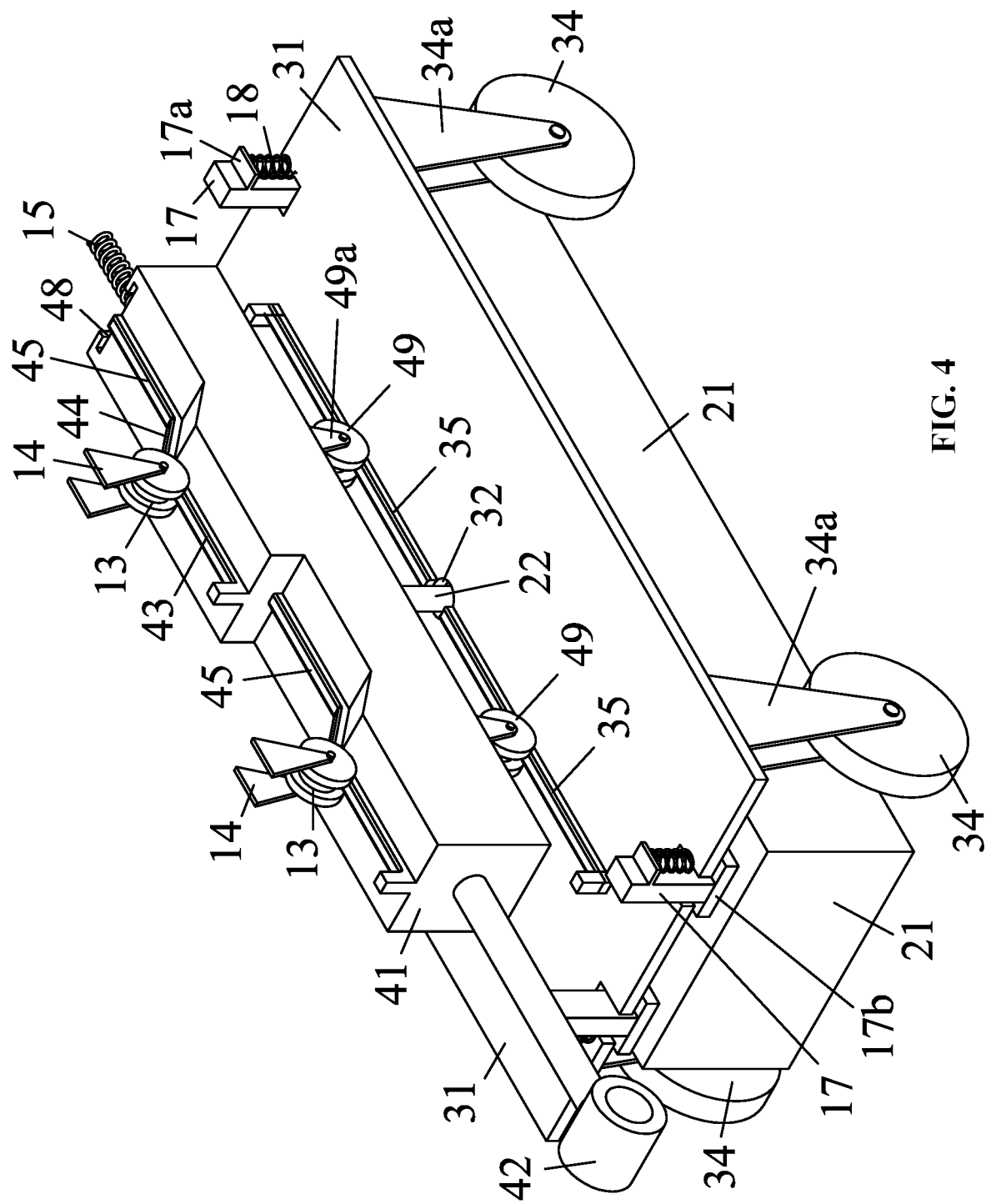
FIG. 4 is a stereogram of a magnetic carrying platform in FIG. 1 excluding an outer frame.
Figure 5:
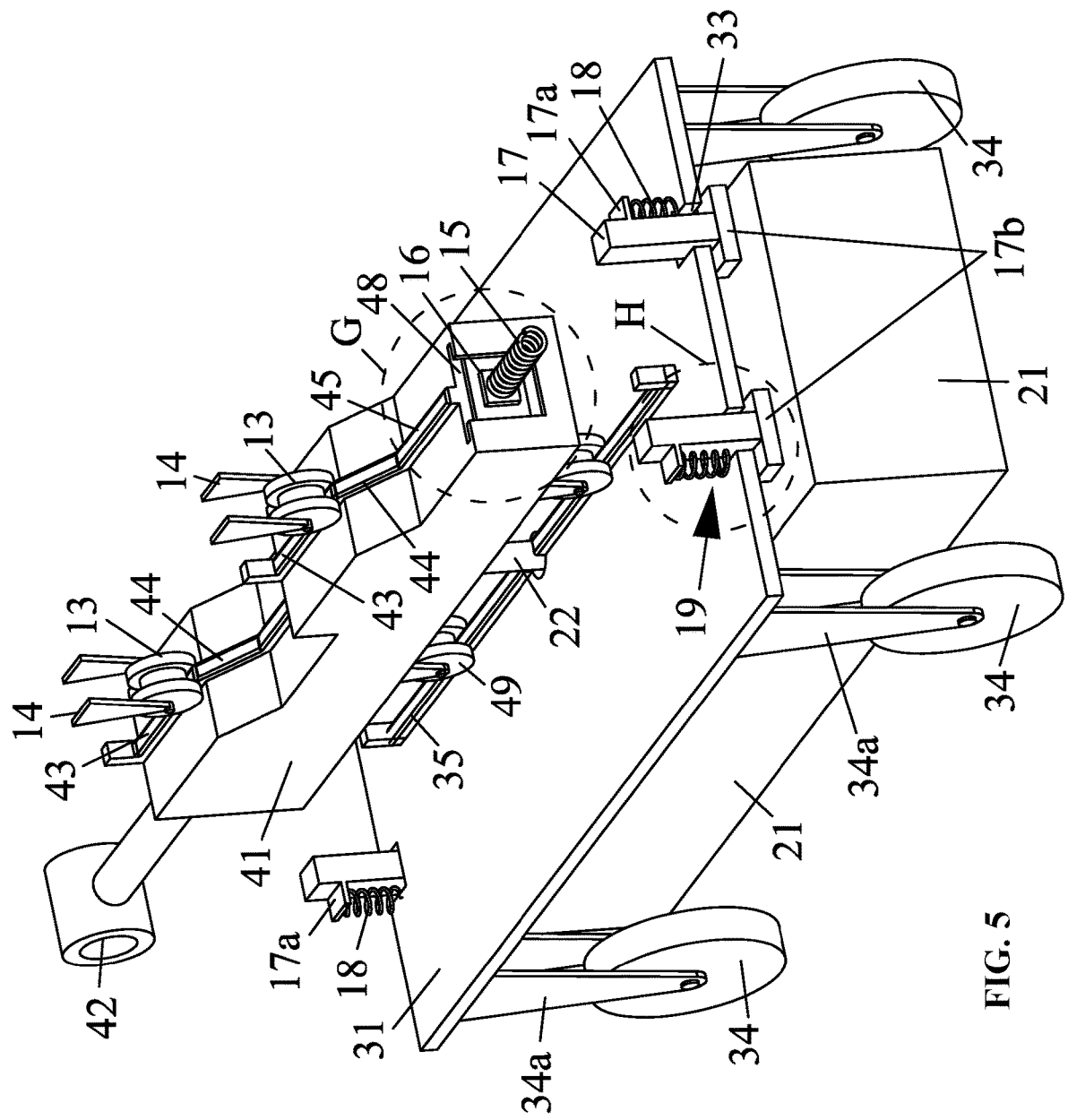
FIG. 5 is another stereogram of a magnetic carrying platform in FIG. 1 excluding an outer frame.
Figure 6:
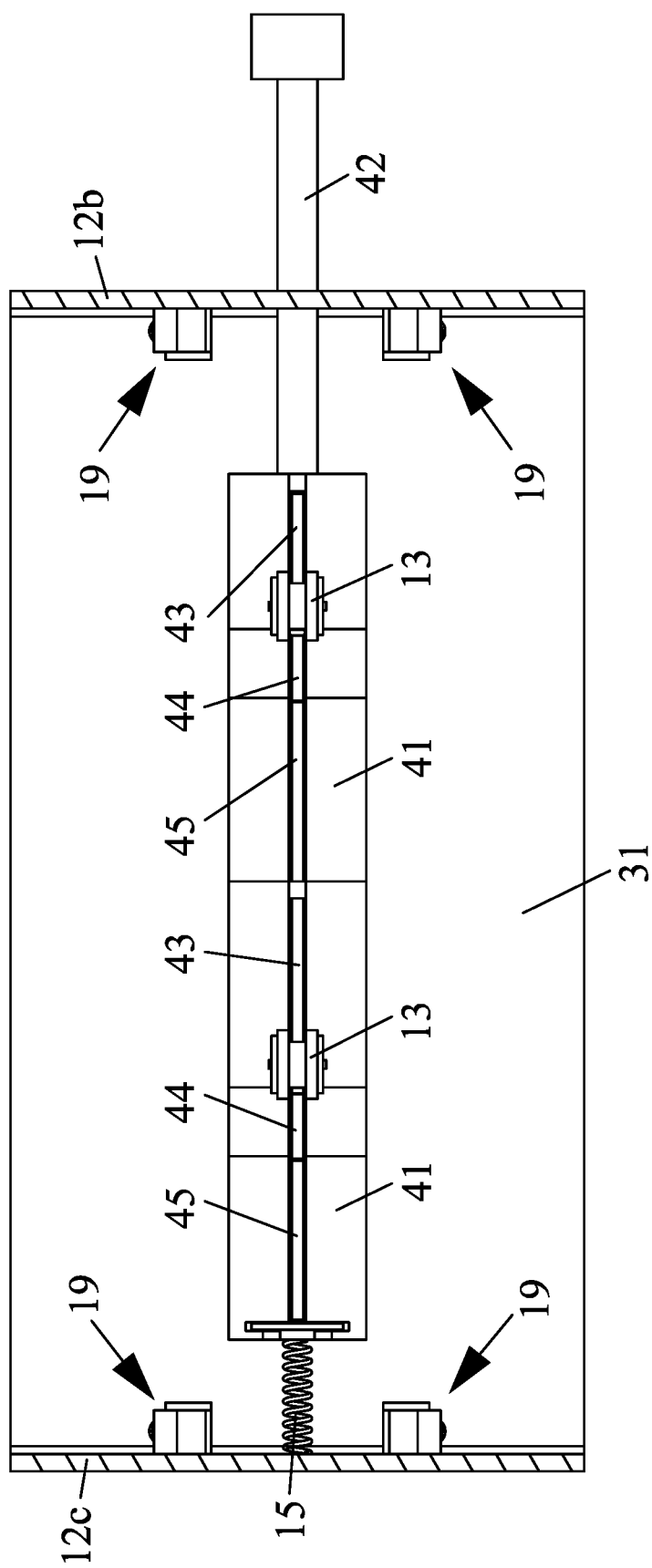
FIG. 6 is a sectional view taken from line A-A in FIG. 2.
Figure 7:
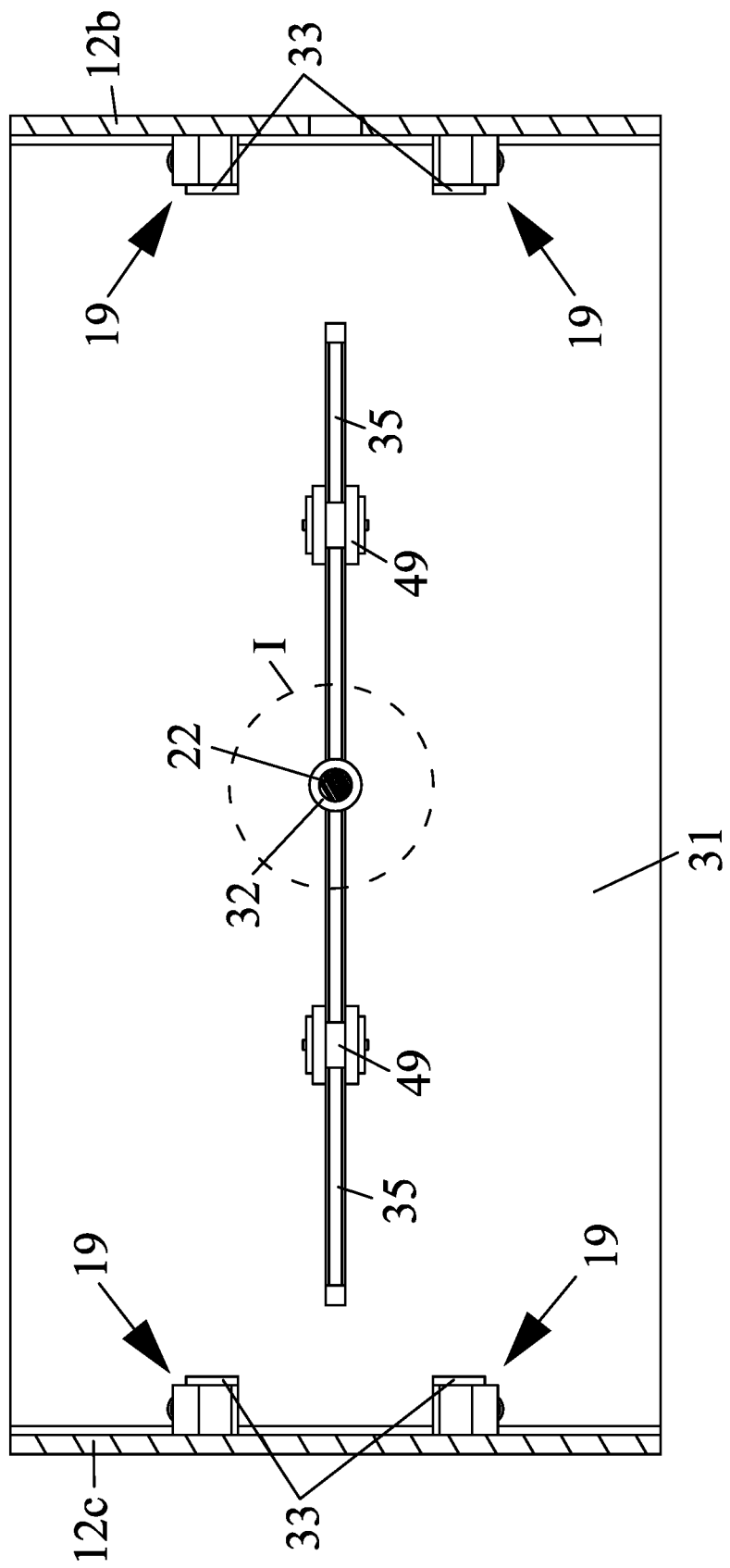
FIG. 7 is a sectional view taken from line B-B in FIG. 2.
Figure 8:
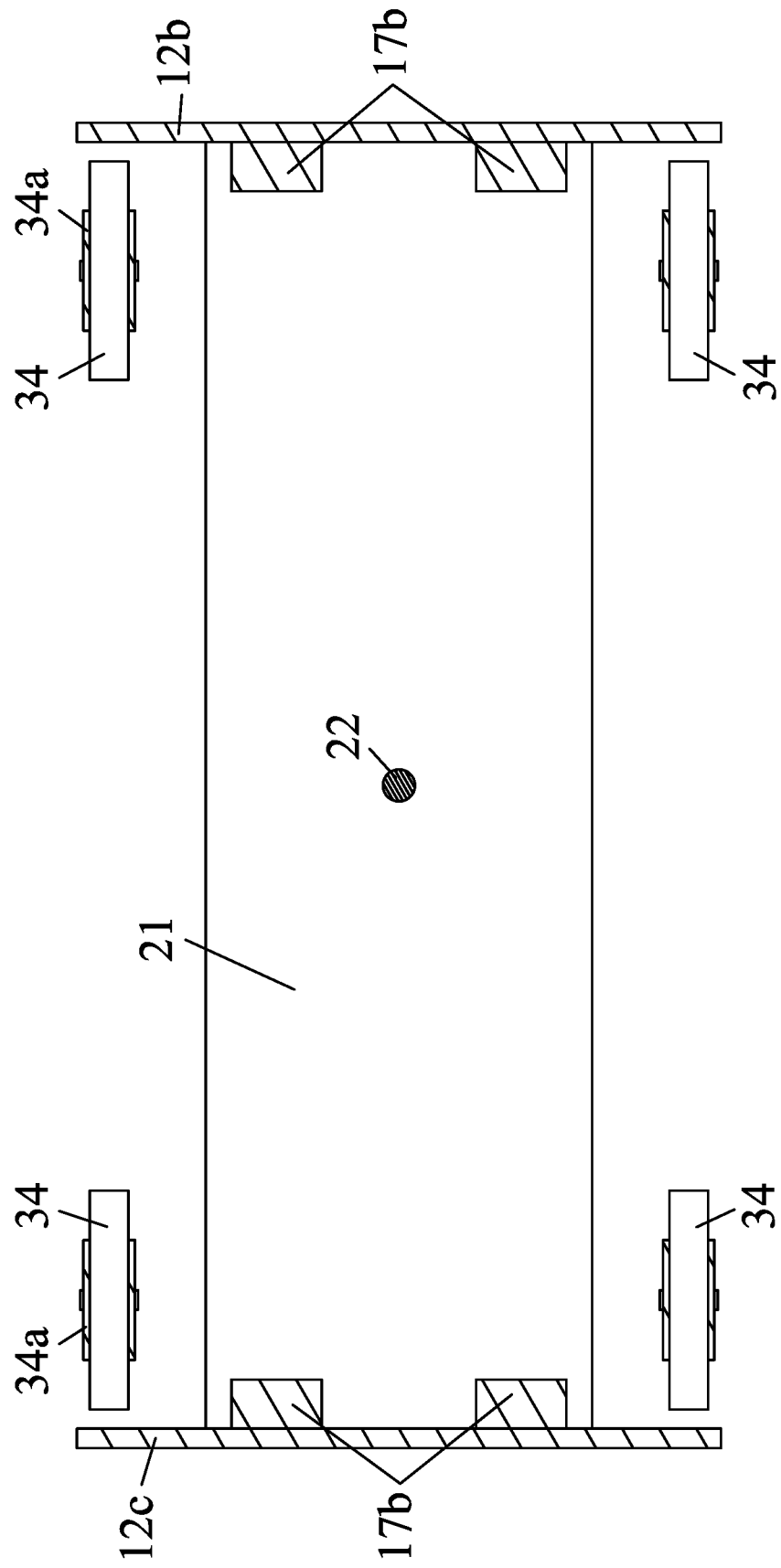
FIG. 8 is a sectional view taken from line C-C in FIG. 2.
Figure 9:
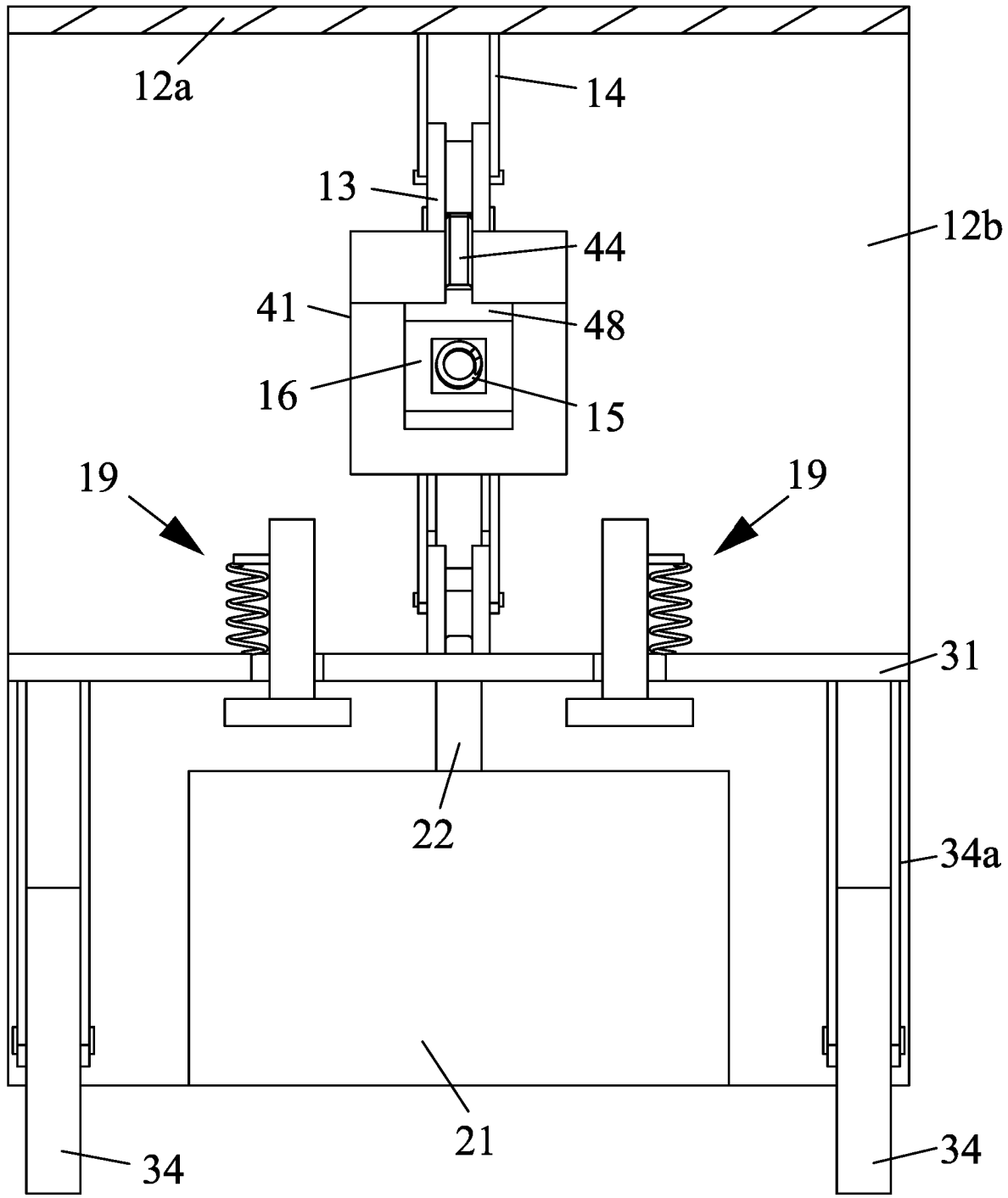
FIG. 9 is a sectional view taken from line D-D in FIG. 2.
Figure 10:
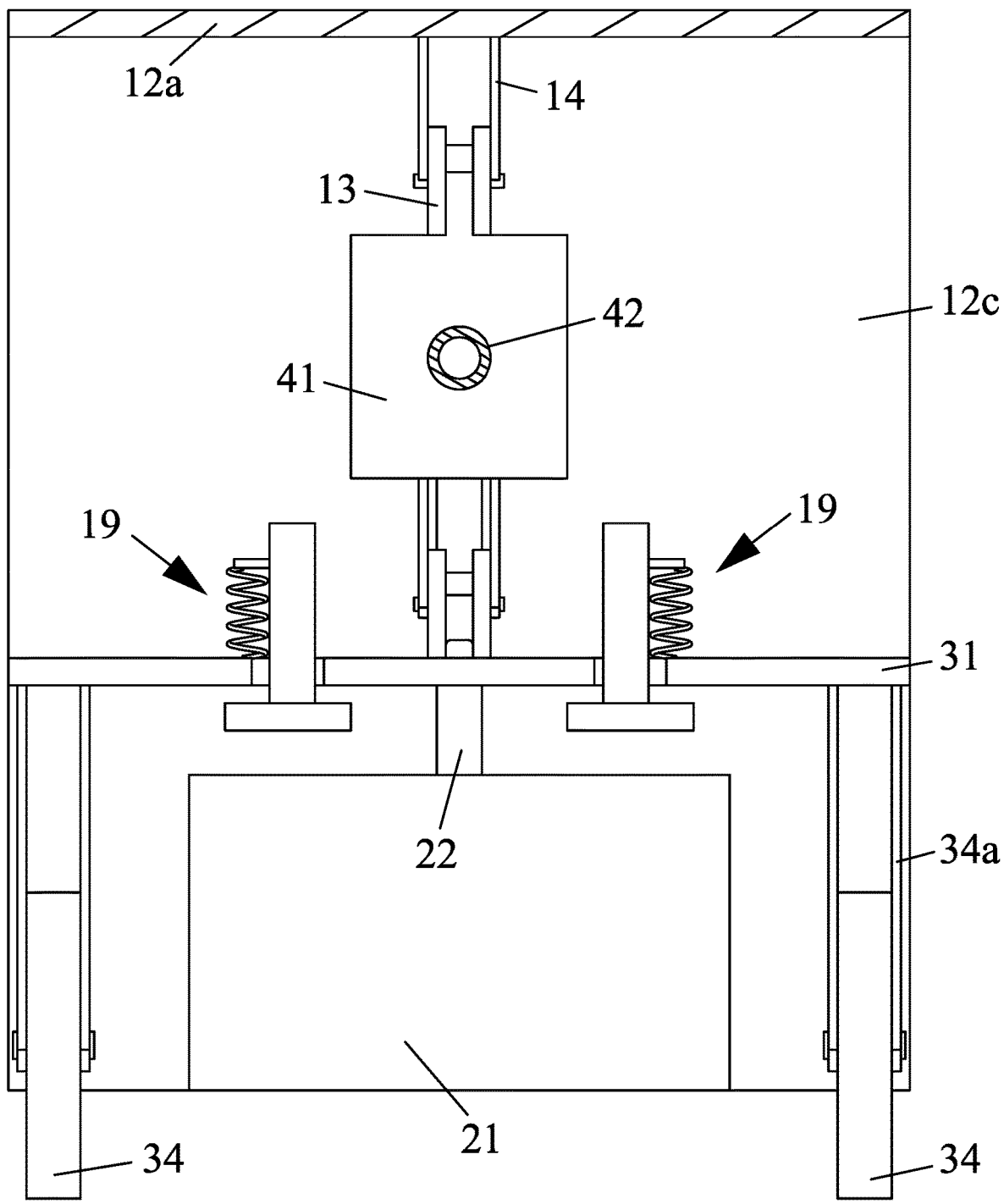
FIG. 10 is a sectional view taken from line E-E in FIG. 2.
Figure 11:
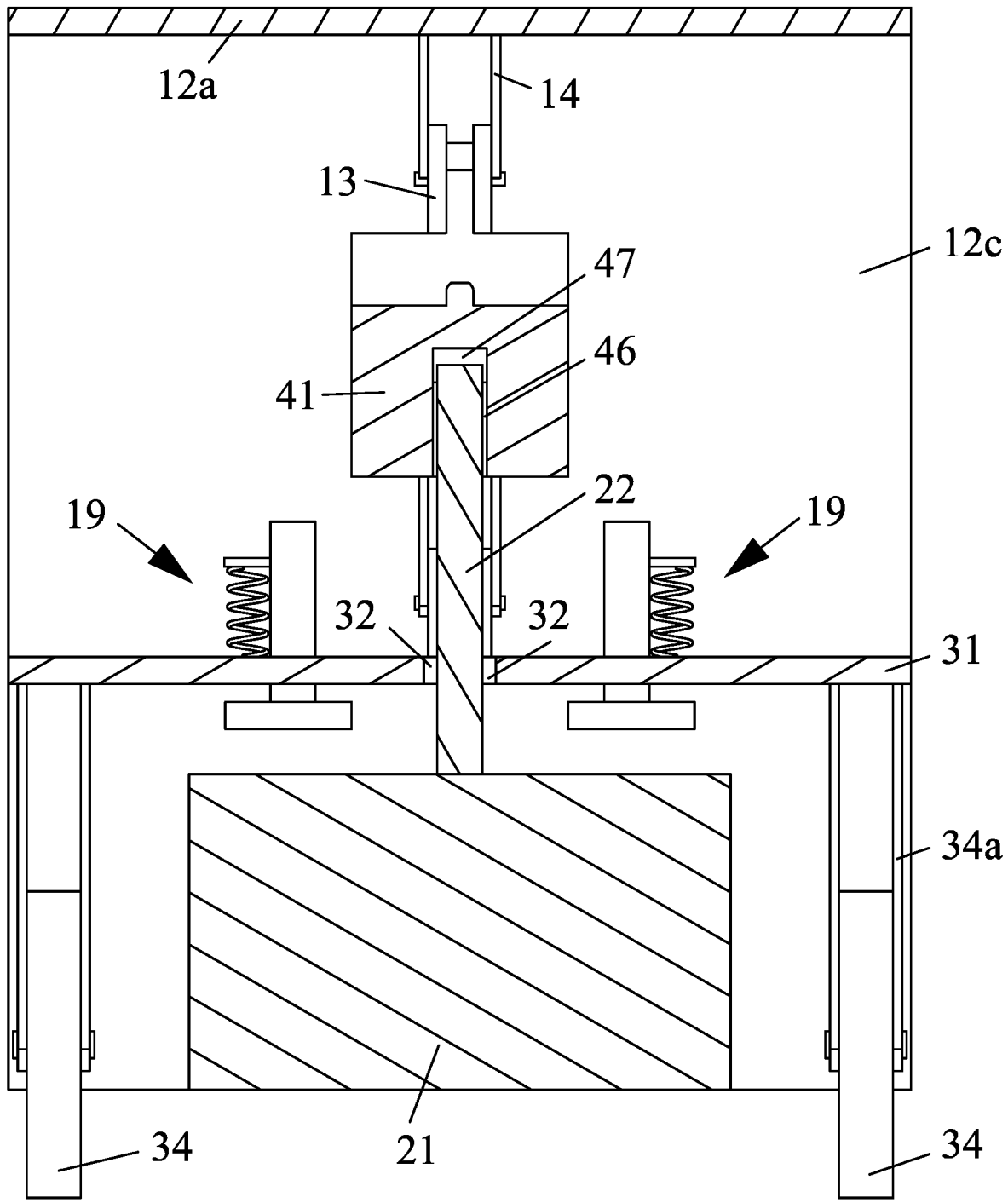
FIG. 11 is a sectional view taken from line F-F in FIG. 2.
Figure 12:
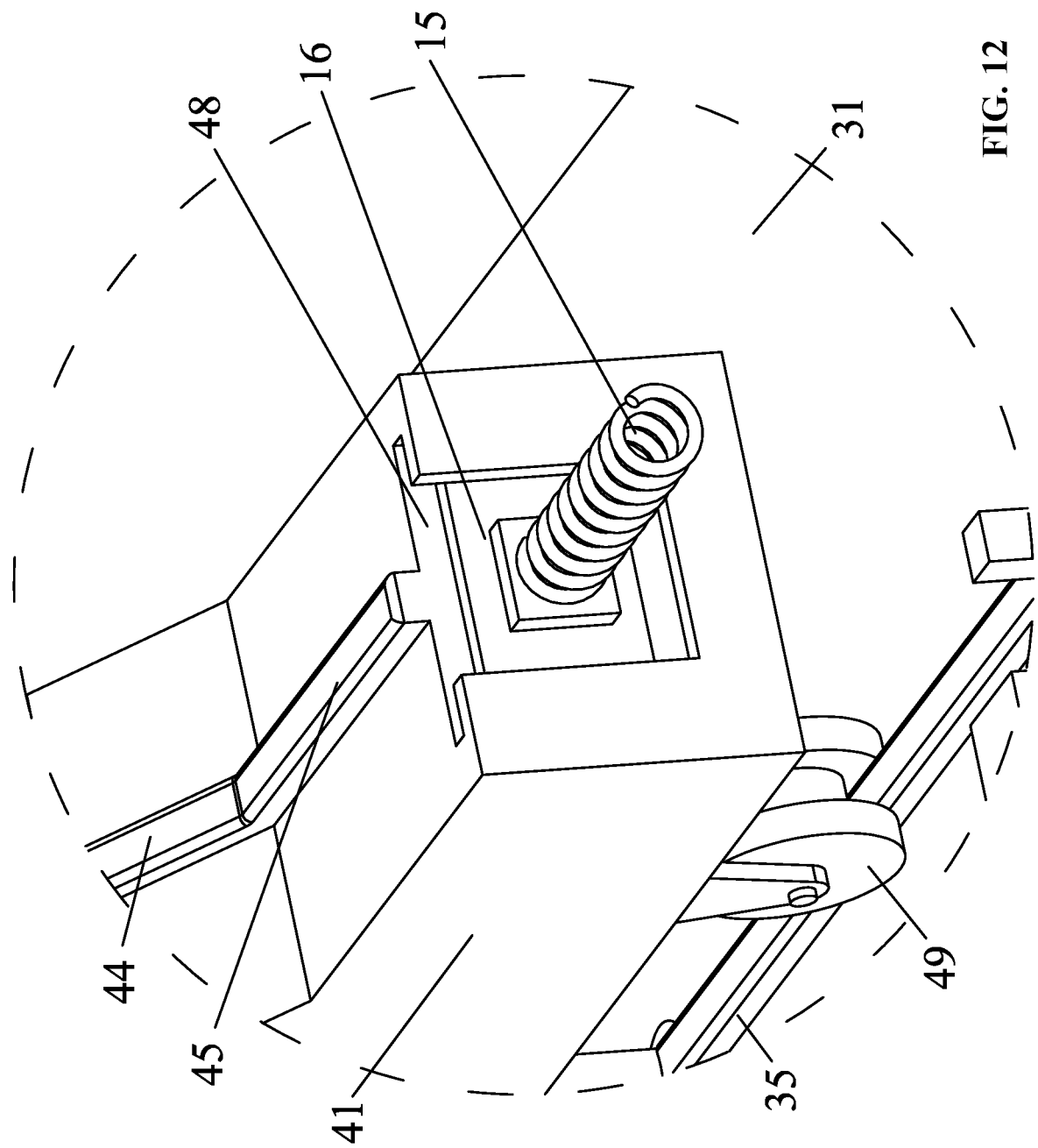
FIG. 12 is a local enlarged view of part G in FIG. 5.
Figure 13:
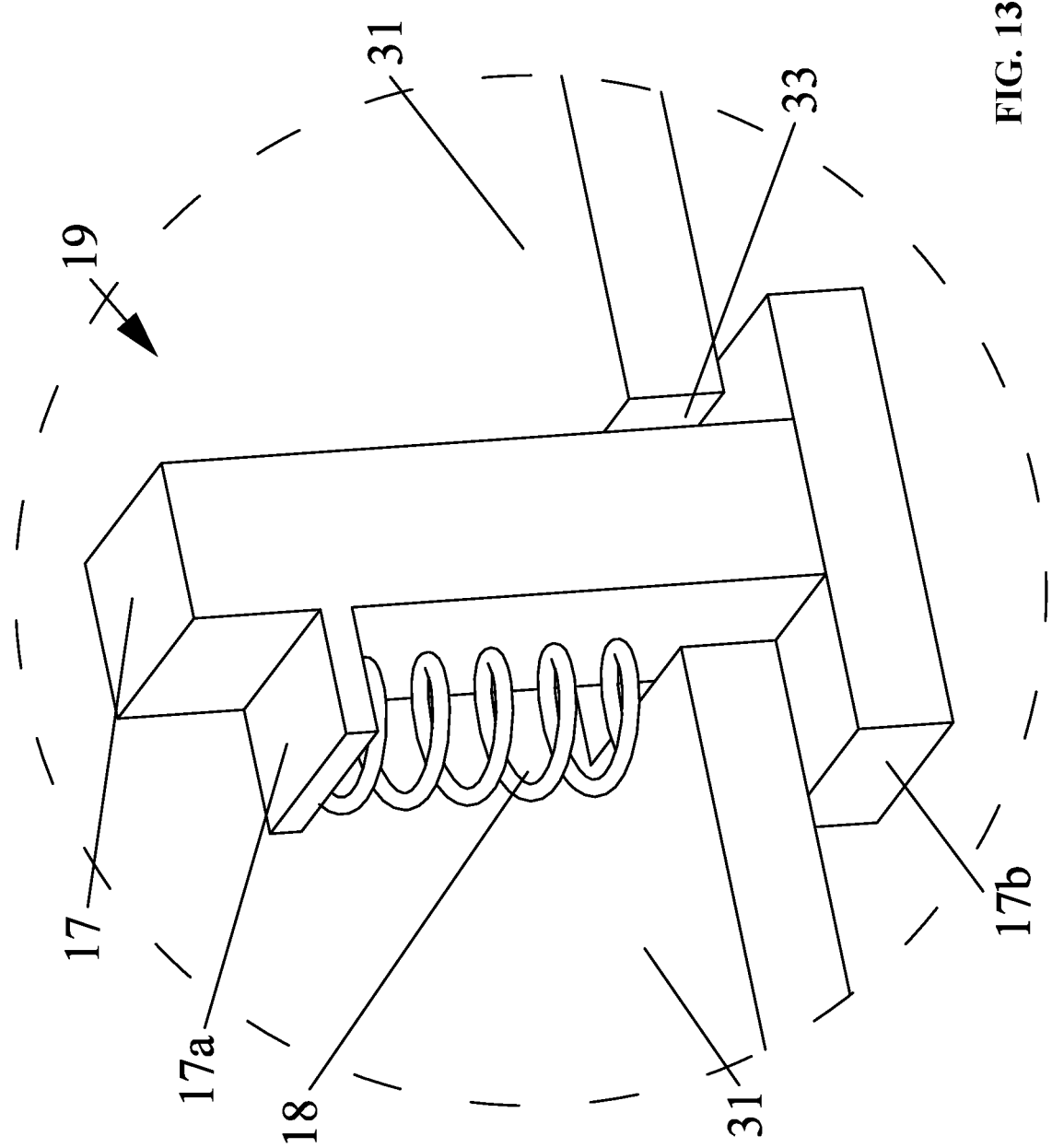
FIG. 13 is a local enlarged view of part H in FIG. 5.
Figure 14:
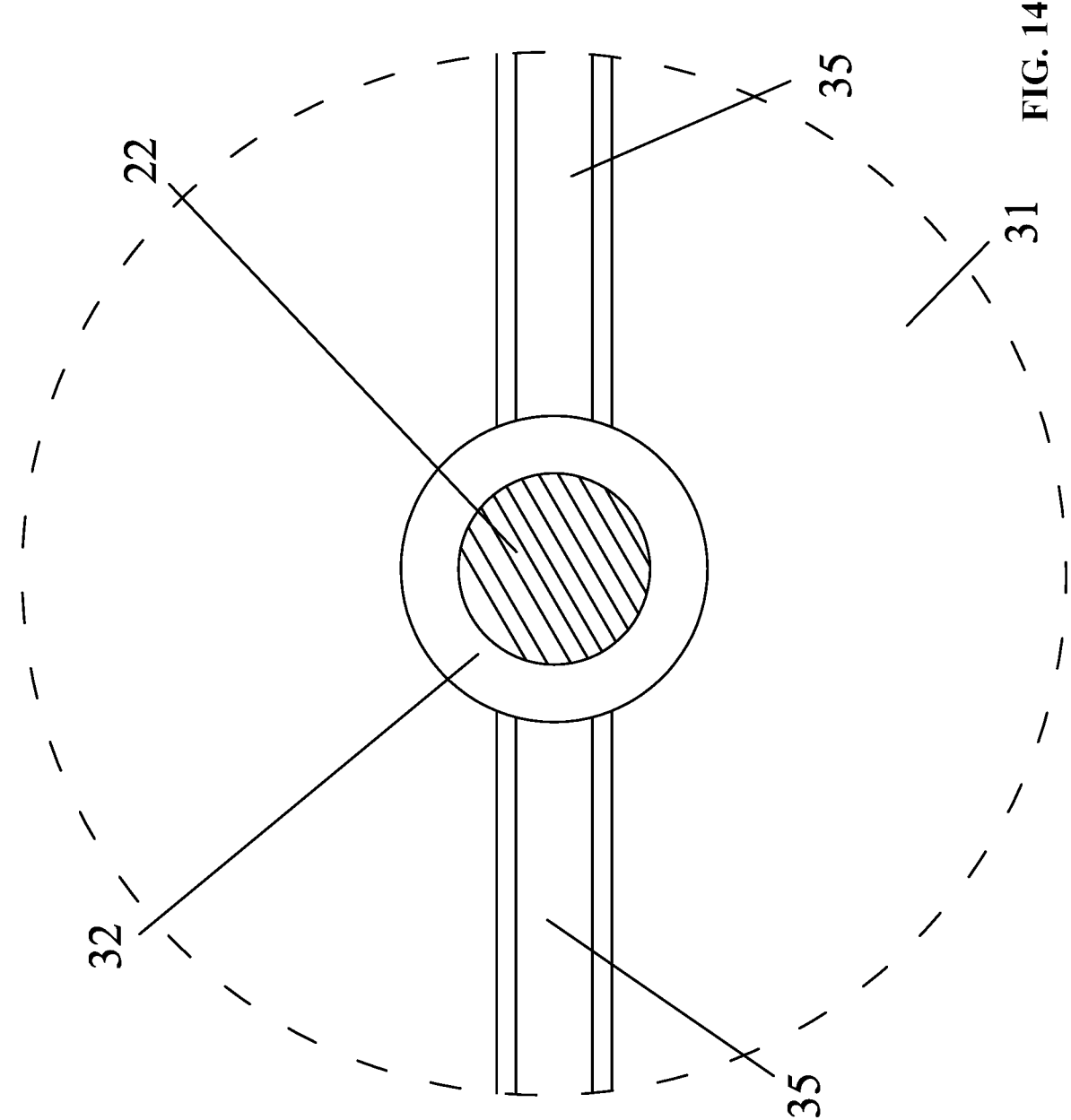
FIG. 14 is a local enlarged view of part I in FIG. 7.

In the drawings, the following reference numbers are used: 11. outer frame; 12a. face plate; 12b. first side plate; 12c. second side plate; 12d. through hole; 13. first drop center wheel; 14. first bracket; 15. pressure spring; 16. convex sliding plate; 17. first guide rail; 17a. spring stop; 17b. limit plate; 18. tension spring; 19. guide structure; 21. permanent magnet block; 22. cylindrical touch rod; 31. platform plate; 32. round hole; 33. guide groove; 34. magnetic travelling wheel; 34a. second bracket; 35. second guide rail; 41. trough type slider; 42. pull bar; 43. upper horizontal rail; 44. slanted rail; 45. lower horizontal rail; 46.

bottom sideway; 47. recess; 48. side slideway; 49. second drop center wheel; 49*a*. third bracket; 51. hull surface.

DETAILED DESCRIPTION

To further illustrate, experiments detailing a magnetic carrying platform are described below. It should be noted that the following examples are intended to describe and not to limit the description.

FIGS. 1-14 illustrate a magnetic carrying platform for use on the surface of decks and bulkheads of the ships to carry welding, cleaning, and coating machineries. The magnetic carrying platform comprises a magnetic frame mechanism; a platform mechanism; and a slider mechanism.

The magnetic frame mechanism comprises an outer frame 11, first drop center wheels 13, first brackets 14, a permanent magnet block 21; the outer frame 11 comprises a face plate 12*a*, a first side plate 12*b*, and a second side plate 12*c*; the first side plate 12*b* and the second side plate 12*c* are vertically fixed on two ends of the face plate 12*a*, respectively; the permanent magnet block 21 is sandwiched between the first side plate 12*b* and the second side plate 12*c*; the first side plate 12*b* and the second side plate 12*c* comprise guide structures 19, and the guide structures 19 comprise first guide rails 17; the first drop center wheels 13 are fixed on an inner side of the face plate 12*a* via the first brackets 14, respectively.

The platform mechanism comprises a platform plate 31, four magnetic travelling wheels 34, four second brackets 34*a*, a second guide rail 35 disposed on a surface of the platform plate 31, and a tension spring 18; two ends of the platform plate 31 comprises guide grooves 33, and the guide grooves 33 correspond to the first guide rails 17 so that the platform plate 31 is capable of moving along the first guide rails 17 of the first side plate 12*b* and the second side plate 12*c*; the first guide rails 17 each comprises a spring stop 17*a* above the platform plate 31 and a limit plate 17*b* disposed below the platform plate 31; the tension spring 18 is disposed between the spring stop 17*a* and the platform plate 31; the platform plate 31 is supported by the four magnetic travelling wheels 34 via the four second brackets 34*a*.

The slider mechanism comprises a trough type slider 41, a pull bar 42, second drop center wheels 49, and third brackets 49*a*; the trough type slider 41 comprises a bottom slideway 46, a side slideway 48, a convex sliding plate 16 disposed in the side slideway 48, a pressure spring 15, upper horizontal rails 43, slanted rails 44, and lower horizontal rails 45; each slanted rail 44 connects one upper horizontal rail 43 and one lower horizontal rail 45 to form a rail group; the pressure spring 15 is fixed on one end of the convex sliding plate 48, and the convex sliding plate 48 butts against the second side plate 12*c* via the pressure spring 15; the first side plate 12*b* comprises a through hole 12*d* allowing the pull bar to pass through; the convex sliding plate 16 is disposed on one end of the trough type slider 41, and the other end of the trough type slider 41 is connected to the pull bar 42 passing through the through hole 12*d* of the second side plate 12*c*; a plurality of rail groups is continuously disposed on the trough type slider 41, and each rail group corresponds to one first drop center wheel 13; the second drop center wheels 49 are connected to the trough type slider 41 via the third brackets 49*a*; the second drop center wheels 49 correspond to the second guide rail 35 disposed on the surface of the platform plate 31.

The platform plate 31 comprises a round hole 32, the permanent magnet block 21 comprises a cylindrical touch rod 22, the bottom slideway 46 comprises a recess 47, and the cylindrical touch rod 22 passes through the round hole 32 of the platform plate 31 and extends into the recess 47 of the bottom slideway 46 of the trough type slider 41.

A method of using the magnetic carrying platform is summarized as follows.

Figure 15:
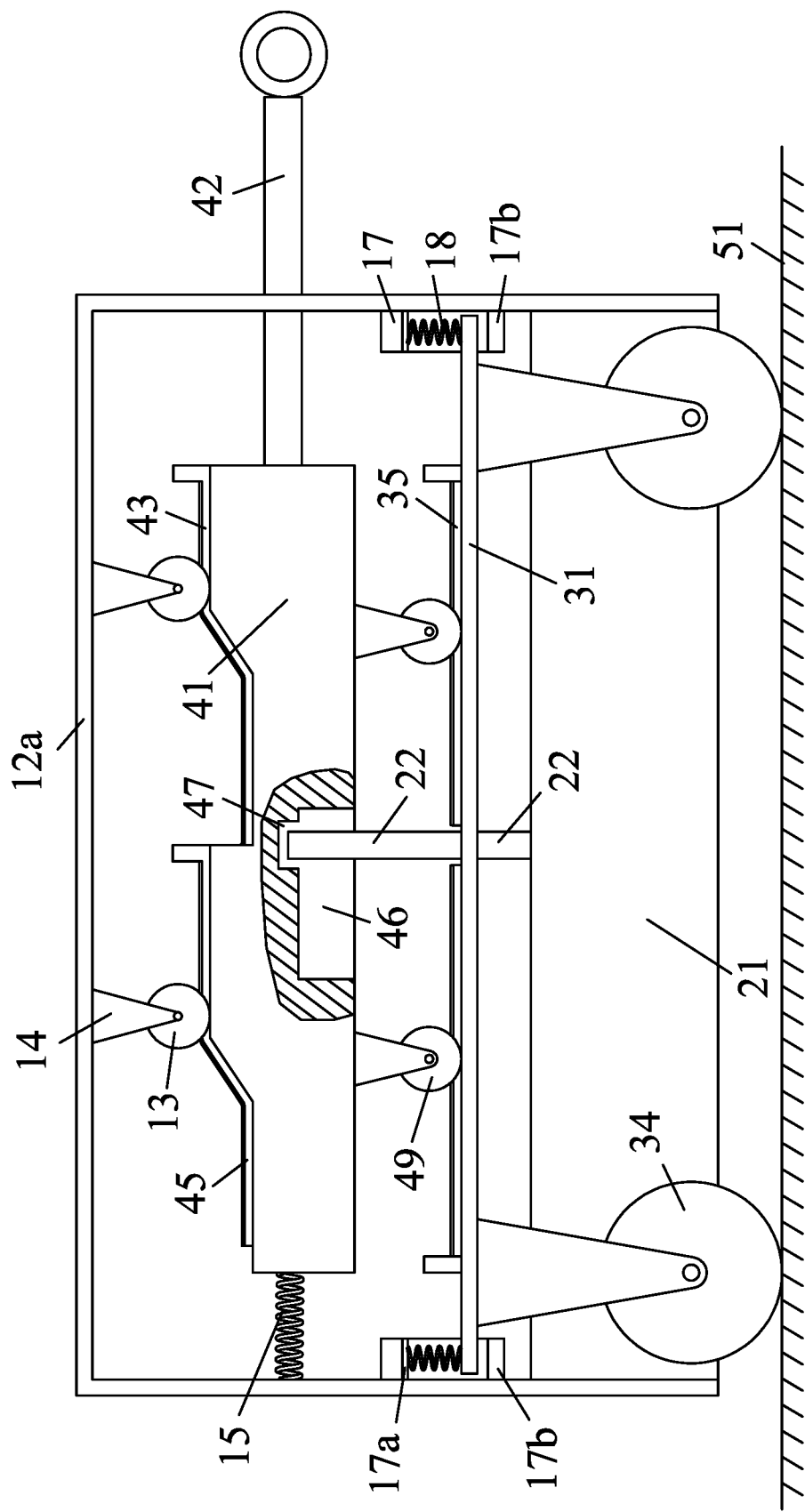
FIG. 15 illustrates an operating state of a magnetic carrying platform where the cylindrical touch rod stays in the recess.

1) In the operating state, the hull surface 51 can be horizontal, vertical to the ground or any arbitrary angle. Under the combined action of the four magnetic travelling wheels 34 and the permanent magnet block 21, the magnetic carrying platform is tightly adhered to the hull surface 51. The distance between the permanent magnetic block 21 and the hull surface 51 remains constant, and the entire magnetic carrying platform is driven by the four magnetic travelling wheels 34. Under the state, the first drop center wheels 13 are rolling on the upper horizontal rails 43, the upper end of the cylindrical touch rod 22 is inserted into the recess 47 of the bottom slideway 46. Under the thrust of the pressure spring 15 and the action of the convex sliding plate 16, the trough type slider 41 stays stably relatively (as shown in FIG. 15).

Figure 16:
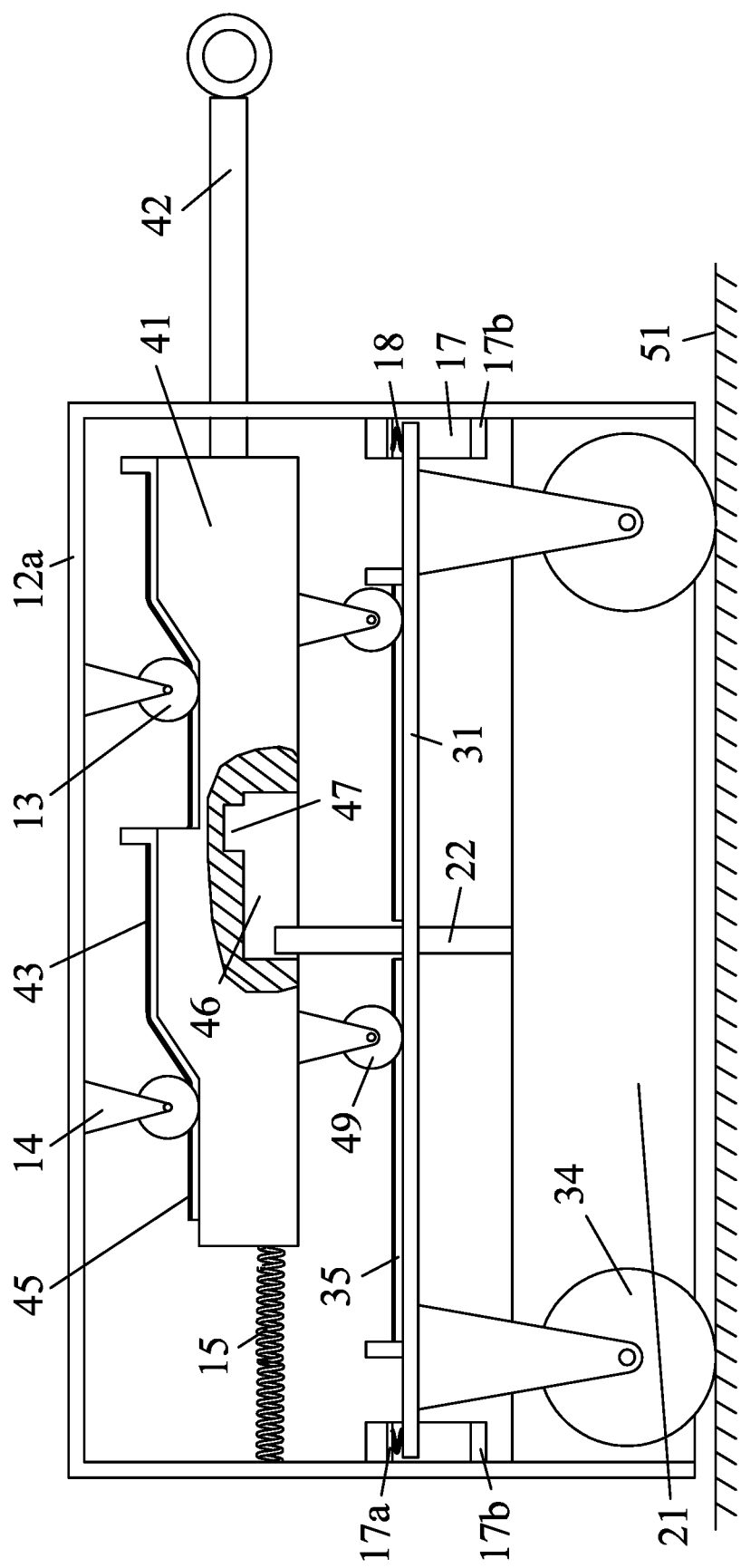
FIG. 16 illustrates a static state of a magnetic carrying platform where the cylindrical touch rod stays in the bottom slideway.

2) When the magnetic travelling wheels 34 encounter an obstacle or the magnetic carrying platform is disturbed by external forces, a relative displacement occurs between the magnetic carrying platform and the slider mechanism. As a result, the cylindrical touch rod 22 detaches from the recess 47 of the bottom slideway 46, the trough type slider 41 moves under the thrust of the pressure spring 15, and the first drop center wheels 13 roll down from the upper horizontal rails 43 to the lower horizontal rails 45 via the slanted rails 44. The upper end of the cylindrical touch rod 22 slides in the bottom slideway 46 of the trough type slider 41. With the pressure release of the pressure spring 15, the trough type slider 41 restores a relatively stable equilibrium state. In this state, the permanent magnet block 21 descends, the distance between the permanent magnet block 21 and the hull surface 51 decreases, the magnetic adsorption force increases, and the entire device restores a stationary state (as shown in FIG. 16).

3) An external force is exerted on the pull bar 42 to drive the trough type slider 41 to move. The pressure spring 15 back to the compression state, and the first drop center wheels 13 roll back from the lower horizontal rails 45 to the upper horizontal rails 43 via the slanted rails 44. The upper end of the cylindrical touch rod 22 returns to the recess 47 of the bottom slideway 46. The permanent magnet block 21 ascends. So, the magnetic carrying platform prepares for next operation.

It will be obvious to those skilled in the art that changes and modifications may be made, and therefore, the aim in the appended claims is to cover all such changes and modifications.

What is claimed is:

1. A device, comprising:
   a magnetic frame mechanism;
   a platform mechanism; and
   a slider mechanism;
   wherein:
   the magnetic frame mechanism comprises an outer frame, first drop center wheels, first brackets, a permanent magnet block;
   the outer frame comprises a face plate, a first side plate, and a second side plate; the first side plate and the second side plate are vertically fixed on two ends of the face plate, respectively;
   the permanent magnet block is sandwiched between the first side plate and the second side plate;

the first side plate and the second side plate comprise guide structures, and the guide structures comprise first guide rails;

the first drop center wheels are fixed on an inner side of the face plate via the first brackets, respectively;

the platform mechanism comprises a platform plate, four magnetic travelling wheels, four second brackets, a second guide rail disposed on a surface of the platform plate, and a tension spring;

two ends of the platform plate comprise guide grooves, and the guide grooves correspond to the first guide rails so that the platform plate is capable of moving along the first guide rails of the first side plate and the second side plate;

the first guide rails each comprises a spring stop above the platform plate and a limit plate disposed below the platform plate;

the tension spring is disposed between the spring stop and the platform plate;

the platform plate is supported by the four magnetic travelling wheels via the four second brackets;

the slider mechanism comprises a trough slider, a pull bar, second drop center wheels, and third brackets;

the trough slider comprises a bottom slideway, a side slideway, a convex sliding plate disposed in the side slideway, a pressure spring, upper horizontal rails, slanted rails, and lower horizontal rails; each slanted rail connects one upper horizontal rail and one lower horizontal rail to form a rail group;

the pressure spring is fixed on one end of the convex sliding plate, and the convex sliding plate butts against the second side plate via the pressure spring;

the first side plate comprises a through hole allowing the pull bar to pass through; the convex sliding plate is disposed on one end of the trough slider, and the other end of the trough slider is connected to the pull bar passing through the through hole of the second side plate;

a plurality of rail groups is continuously disposed on the trough slider, and each rail group corresponds to one first drop center wheel;

the second drop center wheels are connected to the trough slider via the third brackets; the second drop center wheels correspond to the second guide rail disposed on the surface of the platform plate; and the platform plate comprises a round hole, the permanent magnet block comprises a cylindrical touch rod, the bottom slideway comprises a recess, and the cylindrical touch rod passes through the round hole of the platform plate and extends into the recess of the bottom slideway of the trough slider.

* * * * *